United States Patent [19]

Fischer

[11] 4,188,864
[45] Feb. 19, 1980

[54] ELECTRIC COFFEE OR TEA MAKER

[75] Inventor: Kurt Fischer, Bad Durrheim, Fed. Rep. of Germany

[73] Assignee: WIGO Gottlob Widmann & Söhne GmbH, Villingen-Schwenningen, Fed. Rep. of Germany

[21] Appl. No.: 936,030

[22] Filed: Aug. 23, 1978

[30] Foreign Application Priority Data

Sep. 3, 1977 [DE] Fed. Rep. of Germany ....... 2739834

[51] Int. Cl.² .................. A47J 31/32; A47J 31/54
[52] U.S. Cl. .................................. 99/307; 219/433
[58] Field of Search ............... 99/282, 295, 300, 304, 99/307, 313, 281; 219/535, 432, 433

[56] References Cited

U.S. PATENT DOCUMENTS

| 3,231,716 | 1/1966 | Bosch | 219/535 |
| 3,502,848 | 3/1970 | Fink | 219/433 |
| 3,592,125 | 7/1971 | Flowers | 99/295 |
| 3,968,348 | 7/1976 | Stanfield | 219/535 |
| 4,070,956 | 1/1978 | Brown | 99/304 |

Primary Examiner—Robert W. Jenkins
Attorney, Agent, or Firm—Frishauf, Holtz, Goodman & Woodward

[57] ABSTRACT

A coffee or tea pot is placed on a base plate of the coffee/tea maker. A boiler zone which includes a boiler vessel is located laterally adjacent the pot so that the pot is heated from the side when placed on the base plate in a predetermined position, as determined, for example, by locating notches or grooves. The boiler unit is laterally extended to partly surround the circumference of the side walls of the pot with extension wings. The back of the extension wings is insulated, for example by a housing, which also surrounds the boiler. The arrangement permits a short path of boiling water or steam from the boiler to the top of the pot, while efficiently transferring heat thereto.

9 Claims, 6 Drawing Figures

ELECTRIC COFFEE OR TEA MAKER

The present invention relates to an electric coffee or tea pot, and more particulary to a coffee or tea maker in which water is filled into a container which, then, is heated electrically and brought to a boil, the boiling water or steam being forced through the coffee or tea - retained in a retainer - into the pot; after the coffee or tea has been made, the coffee or tea is kept warm by continuing to heat the pot at a lower heat level.

BACKGROUND AND PRIOR ART

Various types of coffee and tea makers have been proposed, particularly for use with glass coffee or tea pots which are sold as an integral or replacement component for such an element. Difficulties arise in the manufacture of the glass pot and matching the glass pot to the heat transfer surface of the coffee or tea maker. If the heating plate is located in the bottom of the apparatus, so that the coffee or tea pots sits on the heating plate itself, it is difficult to ensure good contact since the coffee or tea pot is hardly ever plane since, customarily, it is a pressed or blown glass element of rather wide tolerance. Locating the heating element beneath the coffee or tea pot requires a comparatively long connecting line for water from the heating element to the top of the coffee or tea pot, so that the water reaching the coffee or tea through which it percolates is not at the optimum high temperature anymore when it actually reaches the percolating surface.

THE INVENTION

It is an object to provide an improved coffee or tea pot in which the length of the riser pipe, and the connection between a water supply and the coffee or tea pot is reduced; which is easy to clean; and in which there is good heat transfer between the heater element and the coffee or tea pot itself.

Briefly, the heater plate is located laterally, that is, at the side of the coffee or tea pot, and is so shaped that it surrounds a portion of the circumference thereof, preferably having extending wings which extend further along the circumference of the pot. If the pot is round, the wings are part-cylindrical covering segments of the pot.

The arrangement provides for heating of the reception vessel, that is, of the pot laterally, in horizontal direction. The water chamber and boiler as well as the housing partly surround the pot, providing for good heat transfer, good heat contact, and being located upwardly from the base plate, permits a substantial decrease in the length of the connecting lines for water to be supplied as well as in the riser for boiling water and/or steam.

Drawings, illustrating a preferred example, wherein.

Figure 1:
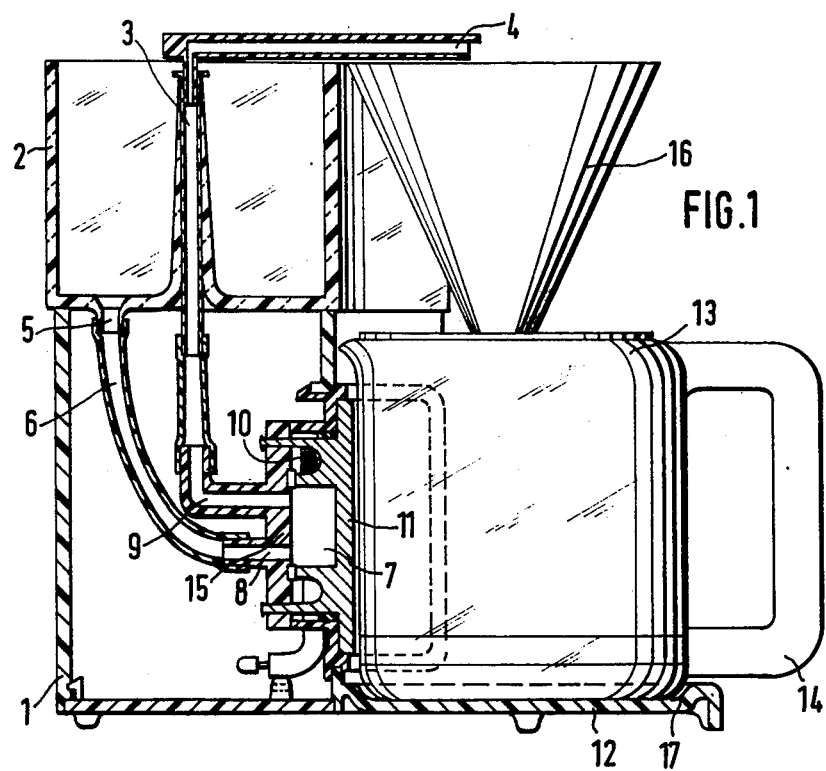
FIG. 1 is a longitudinal cross-sectional view through the coffee or tea maker.
Figure 2:
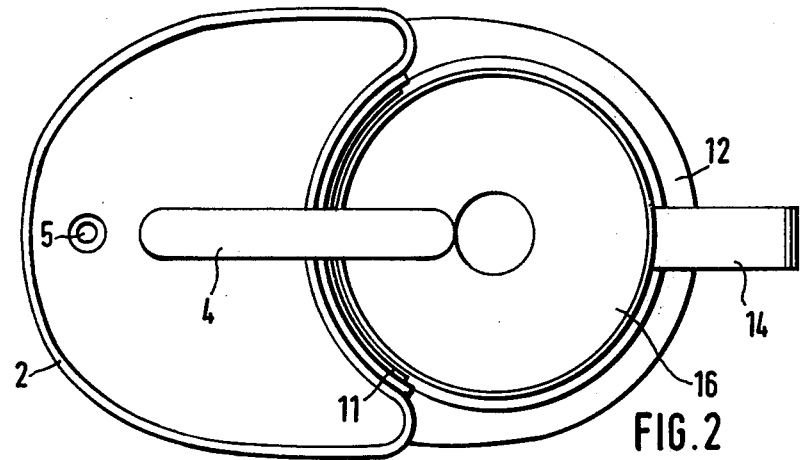
FIG. 2 is a top view thereof.
Figure 5:
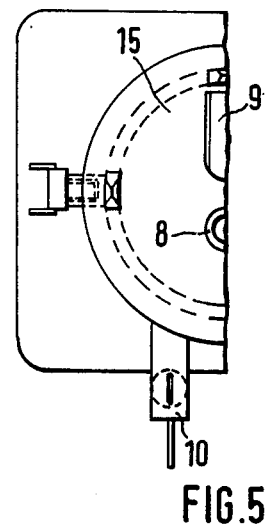
FIG. 5 is a fragmentary rear view of the boiler unit, showing the left half.
Figure 4:
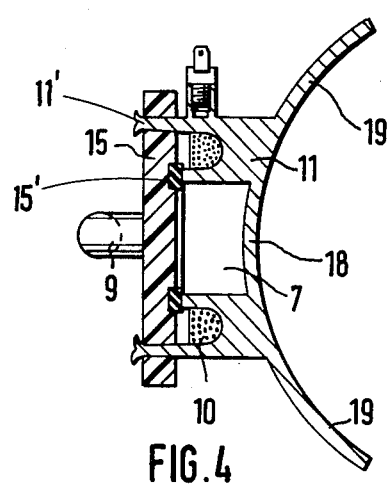
FIG. 4 is a transverse sectional view of the boiler unit.
Figure 6:
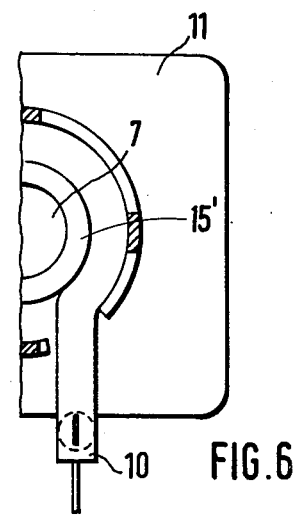
FIG. 6 is a fragmentary rear view of the boiler unit, with the cover plate removed, and showing the right half.

A housing 1 has a fresh water container 2 with an outlet stub 5 from which a flexible tube 6 leads to the inlet stub 8 of a boiler or boiler chamber 7. The outlet stub 9 of the boiler is joined to a riser pipe 3. A heater, typically an electrical heating coil 10 (FIGS. 1, 4, 5) is located in, or surrounding the boiler chamber 7, as well known, and as customary in many electrical appliances providing hot or boiling water. The boiler 10 is used to heat not only the water within chamber 7 but additionally to heat a heater plate 11 located laterally adjacent a coffee or tea pot 13. The bottom 12 of the housing 1 retains the pot 13 and, to position the pot closely adjacent the heater plate 11, the bottom 12 is formed with a circumferential ridge 17 into which the pot 13 fits. Other locating elements, such as grooves and matching projections on the vessel 13 or projecting buttons can be used.

Figure 3:
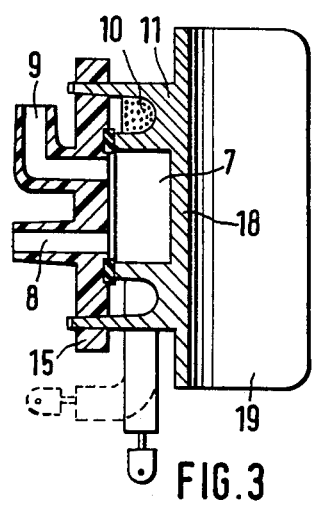
FIG. 3 is a sectional view of the boiler unit.

The heater 11 is extended laterally by wings 19. The inner wall 18 of the heater 11 as well as the wings 19 are shaped to match the outer circumference of the pot 13; typically, the pot 13 is round and the wall 18 and wings 19 are part-cylindrical segments. The chamber 7 included in the heating plate 11 is thus defined on the one side by the wall 18 which receives the pot 13. The other side of the chamber 7 is defined by a cover plate 15 set against chamber 17, for example, by means of a sealing ring 15' (FIG. 3) and projecting stubs 11' which pass through matching openings in the plate 15 from the heater plate 11, and are deformed at the end to retain the heater plate in position. If it is desired to removably attach the heater plate, for example for servicing or cleaning, then the stubs 11' can be replaced by a suitable screw-and-nut connection, or bolts can be tapped through plate 15 in bosses suitably located around the circumference, for example 120° spaced apart, around the circumference of plate 11. The inlets and outlets 8 and 9 to the boiler chamber 7 are formed in the heater plate 15.

Operation: Before use, the pot 13 is placed in position behind the ridge 17 to fit snugly against the wall 18 and wings 19. If coffee is to be made, it is introduced into a filter funnel 16 set on top of the coffee pot 13. Water is filled into the water filler 2, from which it is conducted through line 6 to chamber 7. Upon energization of the electric heating coil 10, the water is heated while, simultaneously, heating the plate 11. Additional heat is transferred to the pot through the lateral wings 19. The water which is heated in chamber 7, usually mixed with steam, is forced through the outlet 9 and riser pipe 3 to the lateral distribution pipe 4 from which it can drip down through coffee filled in filter 16. The filtered coffee is received in the pot 13.

The boiler wall 18, the heater plate 11 and the wings 19 are preferably made of good heat conductive material, for example aluminum or the like; to prevent accidental contact by a user with the back of the wing-like extensions 19 and with the boiler 11, the housing is made of poor heat conductive material, for example plastic, and surrounds not only the boiler but also the wing-like extension leaving sufficient air space between the back of the wing-like extensions and the outer wall of the housing to provide for heat insulation. This also concentrates heat from the heating plate 11, the inner wall 18 and the extensions 19 against the pot and prevents loss of heat through the back side of the extensions 19 and of the boiler 11 and its cover plate 15. The heater plate is, therefore, completely shielded against accidental contact by the housing or by the pot, respectively, when the pot is in place.

Electrical connections, switches, thermostatic controls, "keep warm" change-over arrangements and the like are not shown since any suitable circuit and switching arrangement can be used, as well known.

Various changes and modifications may be made; for example, the coffee can be retained in suitable holders molded on the housing 1 and located, for example, below the outlet distribution pipe 4 which, for example, may be formed with a plurality of holes similar to a shower head. For universal use, the coffee holder can be made to be replaceable by a tea strainer.

I claim:

1. Electric coffee or tea maker having
   a base plate (12) having means (17) to locate a coffee or tea pot (13) thereon;
   a boiler (7, 10);
   duct means (9, 3, 4) guiding water and/or steam from the boiler to the top of the pot;
   water supply duct means (5, 6) conducting water to the boiler;
   and wherein, in accordance with the invention,
   the boiler (7, 10) is located upwardly from the base plate and laterally adjacent the pot, when the pot is in position on said locating means, and includes an inner wall surrounding a portion of the lateral circumference thereof and at least a portion (9) of the duct means guiding water or steam from the boiler to the top of the pot.

2. Coffee or tea maker according to claim 1, wherein the locating means on the base plate comprise a guide ridge (17) shaped to match, at least in part, the outer circumference of the pot (13) of the coffee or tea maker, and determining the position of the coffee or tea maker (13) to engage a side wall (18) of the boiler.

3. Coffee or tea maker according to claim 1 wherein the boiler is formed with a side wall (18) facing the pot, when the pot is in position on said locating means, said side wall matching the outer circumference of at least a portion of the pot;
   and a cover plate (15) located at the outer side of said side wall (18) and defining with said side wall a boiler chamber, the cover plate (15) including the portions (9) of said duct means guiding boiling water to steam from the boiler to the top of the pot.

4. Coffee or tea maker according to claim 1, further comprising a housing (1) surrounding the boiler and the duct means and enclosing, with clearance, said boiler and said duct means.

5. Coffee or tea maker according to claim 1, wherein the boiler (7, 10) has an outer wall (18) facing the pot;
   and two wing-like extensions, one on each side of the inner wall extending from said inner wall (18) and partly surrounding the outer circumference of the pot.

6. Coffee or tea maker according to claim 5, wherein in the pot, in plan view, is circular;
   and the wing-like extensions (19) are part-cylindrical segmental elements surrounding a portion of the circumference of the pot.

7. Coffee or tea maker according to claim 5, further including a housing (1) surrounding the wing-like extensions (19) at the outer side thereof.

8. Coffee or tea maker according to claim 7, wherein the wing-like extensions are made of good heat-conductive material;
   the housing (1) is made of poor heat-conductive material and has a surface which is spaced from said inner wall (18) of the boiler and of the wing-like extensions to provide a safety spacing from said extensions and prevent accidental contact of a user with the outside of said extensions.

9. Coffee or tea maker according to claim 8, wherein the housing is hollow, and an air space is formed between the outer wall of the housing and the wing-like extensions to concentrate heat from the inner wall of the boiler (18) and said wing-like extensions (19) on the pot and provide insulation towards the back thereof.

* * * * *

UNITED STATES PATENT AND TRADEMARK OFFICE
CERTIFICATE OF CORRECTION

PATENT NO.   :   4,188,864
DATED        :   February 19, 1980
INVENTOR(S)  :   Kurt FISCHER It is certified that error appears in the above-identified patent and that said Letters Patent are hereby corrected as shown below:

Please add Claim 11, to appear as Patent Claim 10.

Claim 10. Coffee or tea maker according to claim 1 wherein the boiler (7, 10) has an outer side wall (18) facing the pot when the pot is in position on said locating means, said outer side wall being shaped to match the upwardly extending circumference of the pot to provide a matching heat transfer surface to a pot positioned immediately adjacent said wall of the boiler and transfer heat from the boiler laterally to the outer side wall of the pot.

On the Title Page, after the "ABSTRACT"  "9 Claims" should read -- 10 Claims --.

Signed and Sealed this

Twenty-fourth Day of June 1980

[SEAL]

Attest:

SIDNEY A. DIAMOND

Attesting Officer

Commissioner of Patents and Trademarks